United States Patent [19]
Hewitt

[11] Patent Number: 5,987,541
[45] Date of Patent: Nov. 16, 1999

[54] COMPUTER SYSTEM USING SIGNAL MODULATION TECHNIQUES TO ENHANCE MULTIMEDIA DEVICE COMMUNICATION

[75] Inventor: Larry D. Hewitt, Austin, Tex.

[73] Assignee: Advanced Micro Devices, Inc., Sunnyvale, Calif.

[21] Appl. No.: 08/812,028

[22] Filed: Mar. 6, 1997

[51] Int. Cl.⁶ .................................................. G06F 15/00
[52] U.S. Cl. ............................................ 710/65; 710/128
[58] Field of Search ..................................... 395/280, 888; 364/200, 900; 340/172; 455/277; 375/22; 371/25.1; 710/101, 128, 105, 129, 60, 65, 70, 33, 61, 127, 69; 709/253, 201; 712/35, 1, 28, 33, 220

[56] References Cited

U.S. PATENT DOCUMENTS

| | | | |
|---|---|---|---|
| 3,828,325 | 8/1974 | Stafford et al. | 340/172.5 |
| 4,024,505 | 5/1977 | Sperling | 340/172 |
| 4,549,311 | 10/1985 | McLaughlin | 455/277 |
| 4,630,108 | 12/1986 | Gomersall | 358/84 |
| 4,787,027 | 11/1988 | Prugh et al. | 364/200 |
| 4,841,475 | 6/1989 | Ishizuka | 364/900 |
| 5,185,765 | 2/1993 | Walker | 375/22 |
| 5,258,655 | 11/1993 | May et al. | 307/139 |
| 5,649,162 | 7/1997 | Klein et al. | 710/129 |
| 5,678,065 | 10/1997 | Lee et al. | 710/60 |
| 5,689,660 | 11/1997 | Johnson et al. | 710/129 |
| 5,692,211 | 11/1997 | Gulick et al. | 710/101 |
| 5,732,224 | 3/1998 | Gulick et al. | 395/280 |
| 5,737,638 | 4/1998 | Byrn et al. | 395/888 |
| 5,740,183 | 4/1998 | Lowe | 371/25.1 |
| 5,748,983 | 5/1998 | Gulick et al. | 395/842 |
| 5,758,177 | 5/1998 | Gulick et al. | 712/1 |
| 5,784,650 | 7/1998 | Gulick et al. | 710/62 |
| 5,797,028 | 8/1998 | Gulick et al. | 712/32 |
| 5,809,261 | 9/1998 | Lambrecht | 710/128 |
| 5,812,800 | 9/1998 | Gulick et al. | 710/128 |
| 5,872,942 | 2/1999 | Swanstrom et al. | 710/129 |
| 5,878,237 | 3/1999 | Olarig | 710/128 |
| 5,892,964 | 4/1999 | Haran et al. | 712/33 |

OTHER PUBLICATIONS

PCI Local Bus Specification, Revision 2.0, Apr. 30, 1993, pp. i–x, 1–198.

*Primary Examiner*—Joseph E. Palys
*Assistant Examiner*—Rijue Mai
*Attorney, Agent, or Firm*—Conley, Rose & Tayon, PC; B. Noel Kivlin

[57] ABSTRACT

A computer system is presented having various devices capable of exchanging data using either binary data signals or a.c. signals created by carrier waveform modulation. The computer system includes a common bus having a signal bandwidth divided up to form two or more separate communication channels. A first channel has a signal bandwidth extending from 0 Hz to an upper frequency limit $f_{H1}$, and is reserved for binary data signals. The signals associated with two or more data transfers occurring within different communication channels at the same time are superimposed upon one another on the signal lines of the common bus. The signals do not interfere with one another, thus allowing simultaneous communication between devices via different communication channels. The ability to transfer data using conventional binary data signals allows compatibility with existing devices. The various devices may include a video/graphics card, a sound card, a hard disk drive, a CD-ROM drive, and a network interface card. When binary data is transferred from a master device having a modulation interface to a target device, the master device may select a channel from a list of channels the target device is configured to use. The master device generates an output signal consisting of either the binary data, if the selected channel is the first channel, or a data-modulated carrier signal. The master device drives the output signal upon a signal line of the bus. The target device receives the output signal and extracts the binary data from the output signal.

22 Claims, 4 Drawing Sheets

COMPUTER SYSTEM USING SIGNAL MODULATION TECHNIQUES TO ENHANCE MULTIMEDIA DEVICE COMMUNICATION

FIELD OF THE INVENTION

This invention relates to methods used to transfer information within computer systems and, more particularly, to computer systems including multimedia devices that convey data across a common bus.

DESCRIPTION OF THE RELATED ART

Computer architectures generally include a plurality of devices interconnected by one or more various buses. For example, modem computer systems typically include a CPU coupled through bridge logic to main memory. The bridge logic also typically couples to a high signal bandwidth local expansion bus, such as the peripheral component interconnect (PCI) bus or the VESA (Video Electronics Standards Association) VL bus. Examples of devices which can be coupled to local expansion buses include video accelerator cards, audio cards, telephony cards, SCSI adapters, network interface cards, etc. An older type expansion bus is generally coupled to the local expansion bus. Examples of such older type expansion buses included the industry standard architecture (ISA) bus, also referred to as the AT bus, the extended industry standard architecture (EISA) bus, or the microchannel architecture (MCA) bus. Various devices may be coupled to this second expansion bus, including a fax/modem sound card, etc.

Personal computer systems were originally developed for business applications such as word processing and spreadsheets, among others. However, computer systems are currently being used to handle a number of real time applications, including multimedia applications having video and audio components, video capture and playback, telephony applications, and speech recognition and synthesis, among others. These real time applications typically require a large amount of system resources and signal bandwidth.

Unfortunately, computer systems originally designed for business applications are not well suited for the real-time requirements of modern multimedia applications. For example, modern personal computer system architectures still presume that the majority of applications executing on the computer system are non real-time business applications such as word processing and/or spreadsheet applications, which execute primarily on the main CPU. In general, computer systems have not traditionally been designed with multimedia hardware as part of the system, and thus the system is not optimized for multimedia applications.

Computer systems which include multimedia hardware are generally required to transfer large amounts of real time or multimedia data between various components. For example, multimedia hardware is typically designed as an add-in card for optional insertion in an expansion bus of the computer system. Multimedia hardware cards situated on an expansion bus are required to access system memory and other system resources for proper operation. These data transfers occur on the one or more buses within the system. Multimedia devices must arbitrate for use of a bus, and other devices which need to use the bus must wait. The result is reduced computer system performance.

Data communications devices typically include an analog modulator-demodulator (modem) which allows an exchange of information via analog electrical signals. The modulator of a transmitting analog modem varies the amplitude, frequency, or phase of an output sinusoidal alternating current (a.c.) signal in direct proportion to an input voltage. The demodulator of a receiving analog modem performs the opposite function of converting the received a.c. signal to an output voltage. In order to transfer digital information, the modulator of a transmitting analog modem varies the amplitude, frequency, or phase of an a.c. signal in direct proportion to an input digital value (i.e., a logic one or a logic zero). The demodulator of a receiving analog modem converts the received a.c. signal to an output digital value.

In a communication system, information is transferred between two devices via a communication channel formed between the devices. In a computer system, devices are coupled to a common bus which functions as a communication channel. The maximum rate at which information may be exchanged via a channel is directly proportional to the signal bandwidth of the communication channel. The signal bandwidth of a communication channel is the range of frequencies in hertz (Hz) within which the amplitude of an output signal is at least 70.7 percent of the amplitude of an input signal. Using a technique called frequency division multiplexing, the signal bandwidth of a communication channel may be divided up to form two or more channels, each created channel having a portion of the signal bandwidth of the original channel.

It would thus be desirable to have a computer system including a common bus having a relatively large signal bandwidth. The signal bandwidth of such a bus may be divided up to form two or more separate communication channels. Each communication channel may then be used to transfer data independently, allowing simultaneous communication between devices via different channels. If the signal bandwidth of an existing computer system bus exceeds a minimum required signal bandwidth based upon the operational information transfer rate, one or more additional channels may be advantageously formed in the unused portion of the signal bandwidth of the bus. The created channels may then be used to transfer data between devices at the same time via the bus. The formation of multiple independent channels allows utilization of the full signal bandwidth of the bus, providing improved efficiency for data transfers and increased computer system performance.

SUMMARY OF THE INVENTION

The problems outlined above are in large part solved by a computer system having an expansion bus with a signal bandwidth divided up to form multiple independent communication channels. One or more real-time multimedia devices coupled to the expansion bus exchange data via the multiple independent communication channels. A first channel has a signal bandwidth extending from 0 Hz to an upper frequency limit $f_{H1}$, and is used for transferring data via conventional binary data signals. The remaining communication channels are used for transferring data via data-modulated carrier signals. The signals associated with two or more data transfers occurring within different communication channels at the same time are superimposed upon one another on the signal lines of the expansion bus. The signals do not interfere with one another, however, thus allowing simultaneous communication between devices via different communication channels. The ability to transfer data using conventional binary data signals allows compatibility with existing devices. The present invention allows utilization of the full signal bandwidth of the expansion bus, providing improved efficiency for data transfers and increased computer system performance.

In one embodiment, the computer system includes a CPU coupled through chip set logic (i.e., bridge logic) to a main memory. The chip set logic also couples to the expansion bus. The expansion bus may be, for example, the peripheral component interconnect (PCI) bus. Various peripheral devices are connected to the PCI bus, including a video/graphics card, a sound card, a hard disk drive, a CD-ROM drive, and a network interface card. Other multimedia devices may further be coupled to the PCI bus as desired. A subset of the computer system components coupled to the PCI bus include a modulation interface which accommodates the conveyance of data-modulated carrier signals across the PCI bus. A memory controller for controlling the transfer of data to and from the main memory may further include a modulation interface.

The signal bandwidth of the PCI bus is divided up to form multiple independent communication channels. Computer system components having a modulation interface may exchange data via data-modulated carrier signals, thus increasing the number of communication channels which may be used. The modulation interface includes a modem, a corresponding data buffer, and a control unit. The modulation interface may also include a configuration memory which stores a list of the channels other devices coupled to the PCI bus are configured to use. In a transmit mode, the modem receives binary data signals from the data buffer. In response to one or more control signals from the control unit, the modem may drive the binary data signals upon the multiplexed address/data or control lines of the PCI bus. Alternatively, in response to the one or more control signals, the modem modulates a sinusoidal a.c. carrier waveform. according to the binary data signals in order to produce a data-modulated carrier signal. The modem then drives the data-modulated carrier signal upon the address/data or control lines of the PCI bus. In a receive mode, the modem receives signals from the address/data or control lines of the PCI bus. In response to one or more control signals from the control unit, the modem may transfer binary data signals present upon the PCI bus to the corresponding data buffer. Alternatively, in response to the one or more control signals, the modem may demodulate a data-modulated carrier signal present upon the address/data or control lines of the PCI bus in order to extract binary data signals, then transfer the binary data signals to the corresponding data buffer.

When a PCI bus transaction is initiated by a first device (i.e., a master device) having a modulation interface in order to transfer binary data to a second device (i.e., a target device), the master device may select a channel from a list of channels the target device is configured to use. The master device generates an output signal consisting of either the binary data, if the selected channel is the first channel, or a data-modulated carrier signal if the selected channel is not the first channel. The data-modulated carrier signal is produced by modulating the amplitude, frequency, or phase of a sinusoidal a.c. carrier waveform in response to the binary data. The master device drives the output signal upon an address/data line of the PCI bus. The target device receives the output signal. If the output signal is a data-modulated carrier signal, the target device extracts the binary data from the output signal.

Therefore, the present invention accommodates a novel computer system architecture which provides improved efficiency for data transfers and increases the performance of real-time applications. The present invention is also optimized for real-time applications and provides increased performance over current computer architectures. The computer system of the present invention thus provides much greater performance for real-time and multimedia applications than prior systems.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Figure 1:
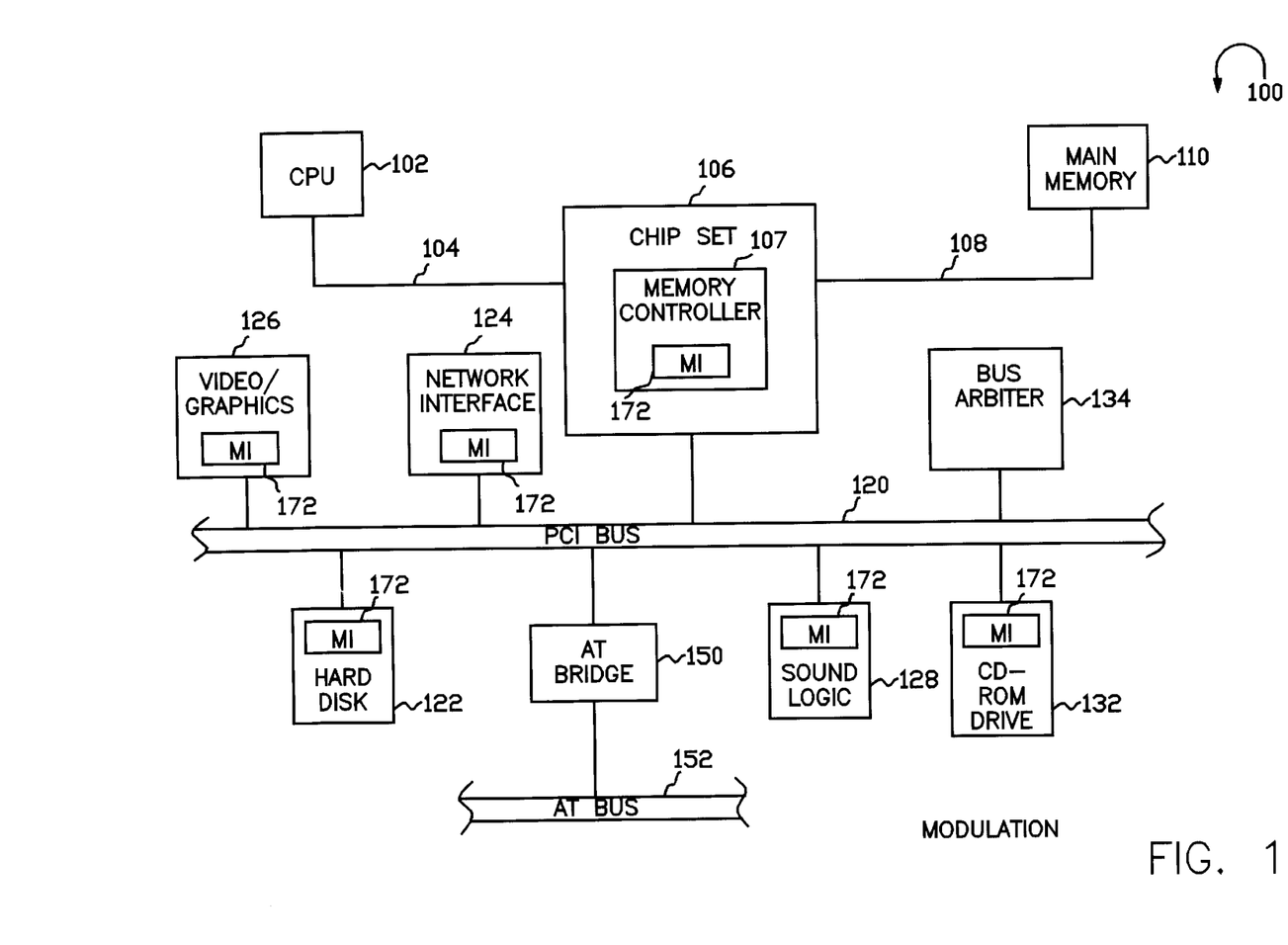
FIG. 1 is a block diagram of a computer system including several components coupled to a peripheral component interconnect (PCI) expansion bus, wherein several of the components include a modulation interface in order to transfer data over the PCI bus using data-modulated carrier signals.

Referring now to FIG. 1, a block diagram of a computer system 100 according to one embodiment of the present invention is shown. As shown, the computer system 100 includes a central processing unit (CPU) 102 which is coupled through a CPU local bus 104 to a host/PCI/cache bridge or chip set logic 106. The chip set logic 106 includes memory controller logic 107 as shown.

The chip set logic 106 may include various peripheral logic, including one or more of an interrupt controller system, a real time clock (RTC) and timers, a direct memory access (DMA) system, and ROM/Flash memory (all not shown). The chip set logic 106 may also include various other peripheral logic, including communications ports, diagnostics ports, command/status registers, and non-volatile static random access memory (NVSRAM).

A second level or L2 cache memory (not shown) may also be coupled to a cache controller in the chip set, as desired. The bridge or chip set logic 106 couples through a memory bus 108 to main memory 110. The main memory 110 is preferably DRAM (dynamic random access memory) or EDO (extended data out) memory, as desired.

In the embodiment of FIG. 1, the chip set logic 106 (i.e., host/PCI/cache bridge) or interfaces to a peripheral component interconnect (PCI) bus 120. It is noted that other local buses may be used, such as the VESA (Video Electronics Standards Association) VL bus. Various types of devices, including multimedia devices, may be connected to the PCI bus 120.

In the embodiment shown, a video/graphics card 126 and a sound card 128 are coupled to the PCI bus 120. The video/graphics card 126 preferably performs video functions and graphics accelerator functions. The video/graphics card 126 may also perform 2-D and 3-D accelerator functions. The video/graphics card 126 preferably includes a video port for coupling to a video monitor (not shown). The sound card 128 performs audio processing functions. The sound card 128 includes an audio digital to analog converter (audio DAC) (not shown) which couples to an audio port, wherein the audio port is adapted for coupling to speakers (not shown).

A hard disk drive 122, a network interface controller 124 and a CD-ROM drive 132 are also shown coupled to the PCI bus 120. CD-ROM drive 132 may be coupled to PCI bus 120 through a SCSI (small computer systems interface) adapter. The SCSI adapter may also couple to various other SCSI devices, such as a tape drive (not shown), as desired. A bus arbiter 134 is provided to arbitrate control of PCI bus 120 among two or more master devices coupled to PCI bus 120.

In the embodiment of FIG. 1, the video/graphics logic 126, the sound logic 128, the CD-ROM drive 132, and the hard disk drive 122 include a modulation interface 172 according to the present invention. The network interface controller 124 and memory controller 107 also include a modulation interface 172. The operation of the modulation interfaces 172 will be described in detail below.

Expansion bus bridge logic 150 may also be coupled to the PCI bus 120. The expansion bus bridge logic 150 interfaces to an expansion bus 152. The expansion bus 152 may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, such as expansion bus memory or a modem (both not shown).

Figure 2:
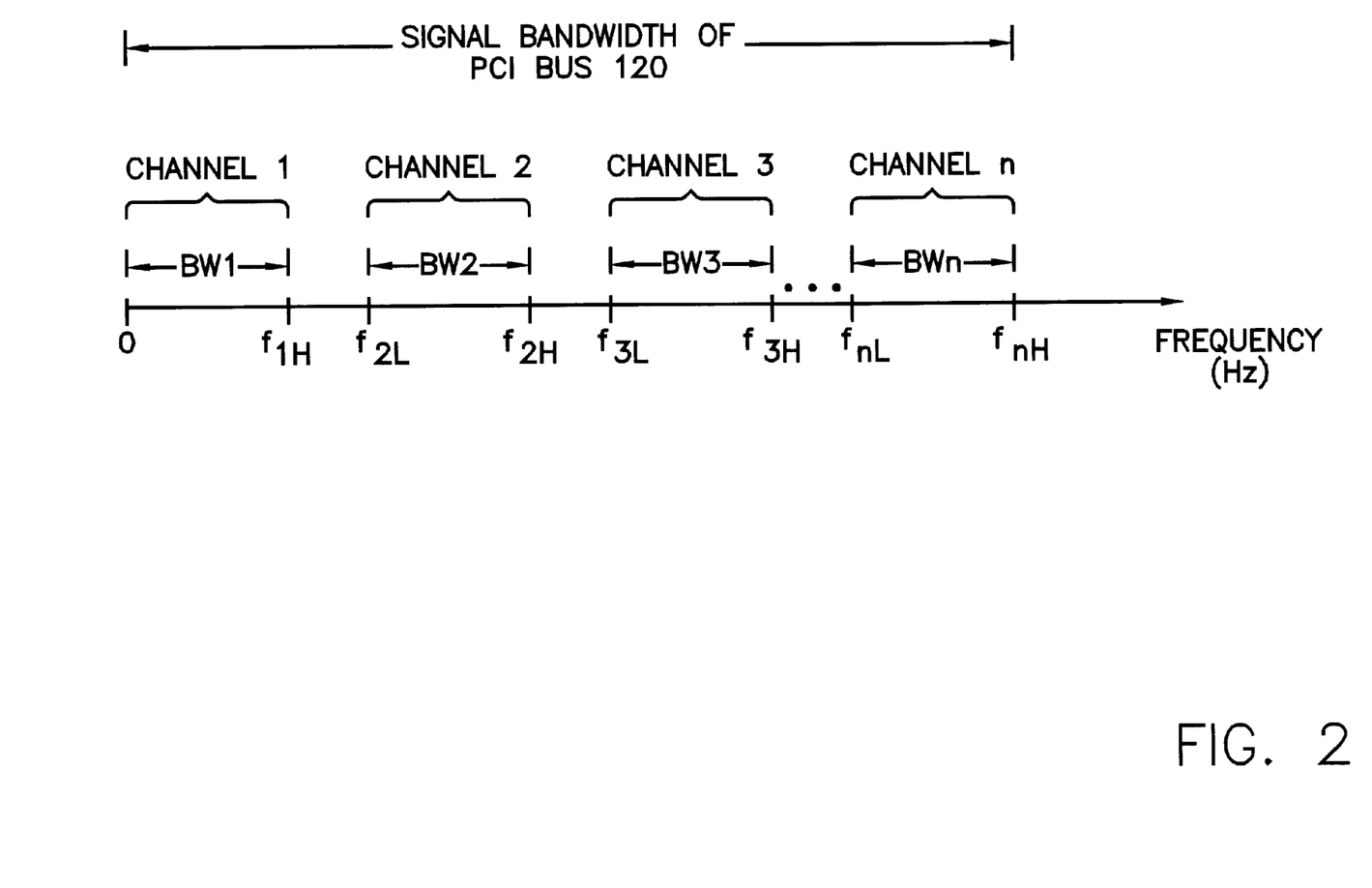
FIG. 2 is a frequency line chart showing how a signal bandwidth of the PCI bus may be divided up into n smaller portions to create n separate communications channels.

FIG. 2 is a frequency line chart showing how a signal bandwidth of PCI bus 120 may be divided up into n portions to create n separate communication channels. Relatively narrow "guard bands" preferably separate adjacent channels. Two or more devices coupled to PCI bus 120 may communicate using one of the n channels. A first communication channel (i.e., channel 1) extends from 0 Hz to an upper frequency limit $f_{H1}$, and is reserved for conventional binary data signals. A first guard band extends from the upper frequency limit $f_{H1}$, to a lower frequency limit $f_{L2}$ of a second communication channel (i.e., channel 2). Channels 2 through n are reserved for a.c signals created by modulating a sinusoidal a.c. carrier waveform.

Figure 3A:
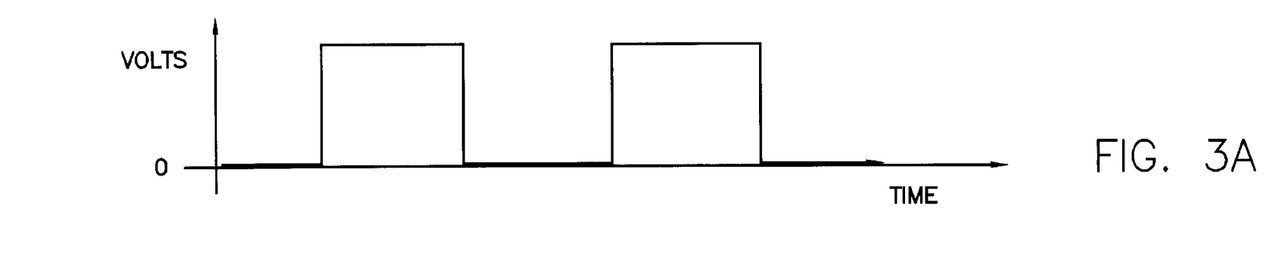
FIG. 3a is a graph of a first conventional binary data signal versus time.
Figure 3B:
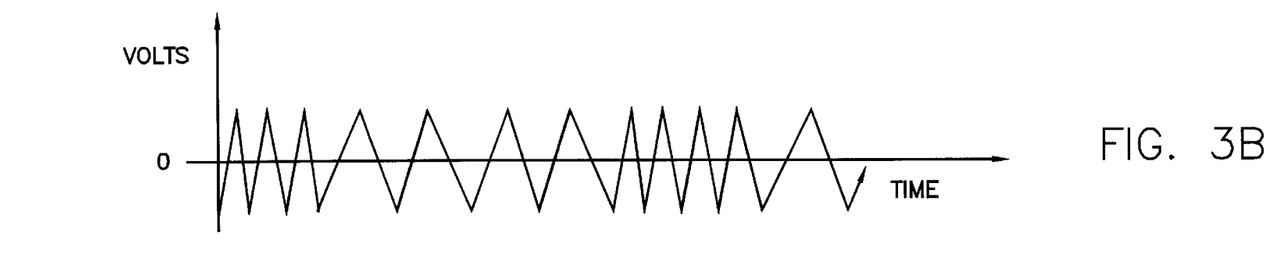
FIG. 3b is a graph of an a.c. frequency-shift keying (FSK) data signal versus time, wherein the FSK signal is produced by modulating the frequency of an a.c. carrier waveform in response to a second binary data signal.
Figure 3C:
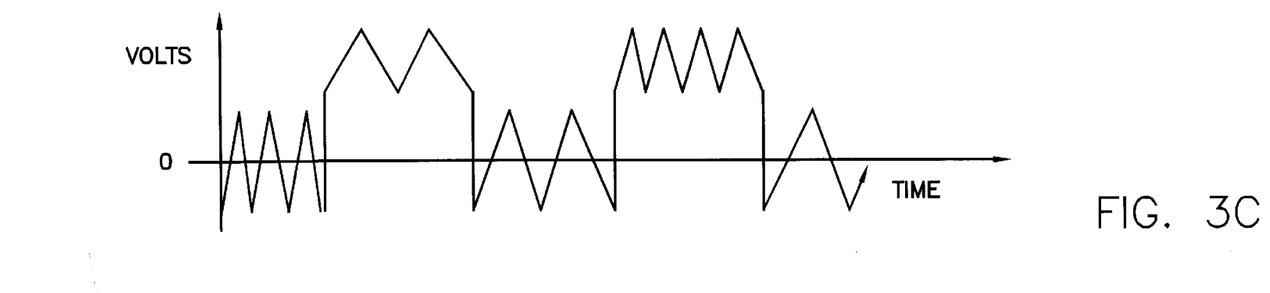
FIG. 3c is a graph of the voltage present upon a signal line of the PCI bus driven simultaneously with the binary data signal of FIG. 3a and the FSK data signal of FIG. 3b.

The modulation interface 172 of each device coupled to the PCI bus 120 is configured to accommodate data transfers using binary data signals or data-modulated carrier signals created by modulating a sinusoidal a.c. carrier waveform. The ability to transfer data using conventional binary data signals allows compatibility with existing devices. FIG. 3a is a graph of a first binary data signal versus time. The binary signal of FIG. 3a is not produced by modulating a carrier waveform. This type of signal, hereinafter referred to as a binary data signal, is commonly employed to convey data in current computer systems. FIG. 3b is a graph of an a.c. frequency-shift keying (FSK) data signal versus time. The FSK data signal is produced by modulating the frequency of a sinusoidal a.c. carrier waveform in response to a second binary data signal. Prior to modulation, the carrier waveform has a non-zero "center" frequency. FIG. 3c is a graph of the voltage present upon a signal line of PCI bus 120 driven simultaneously with the binary data signal of FIG. 3a and the FSK data signal of FIG. 3b. As shown, the amplitude of the FSK data signal is preferably small relative to the amplitude of the conventional data signal in order to prevent read errors by devices coupled to the PCI bus 120 and using binary data signals.

Figure 4:
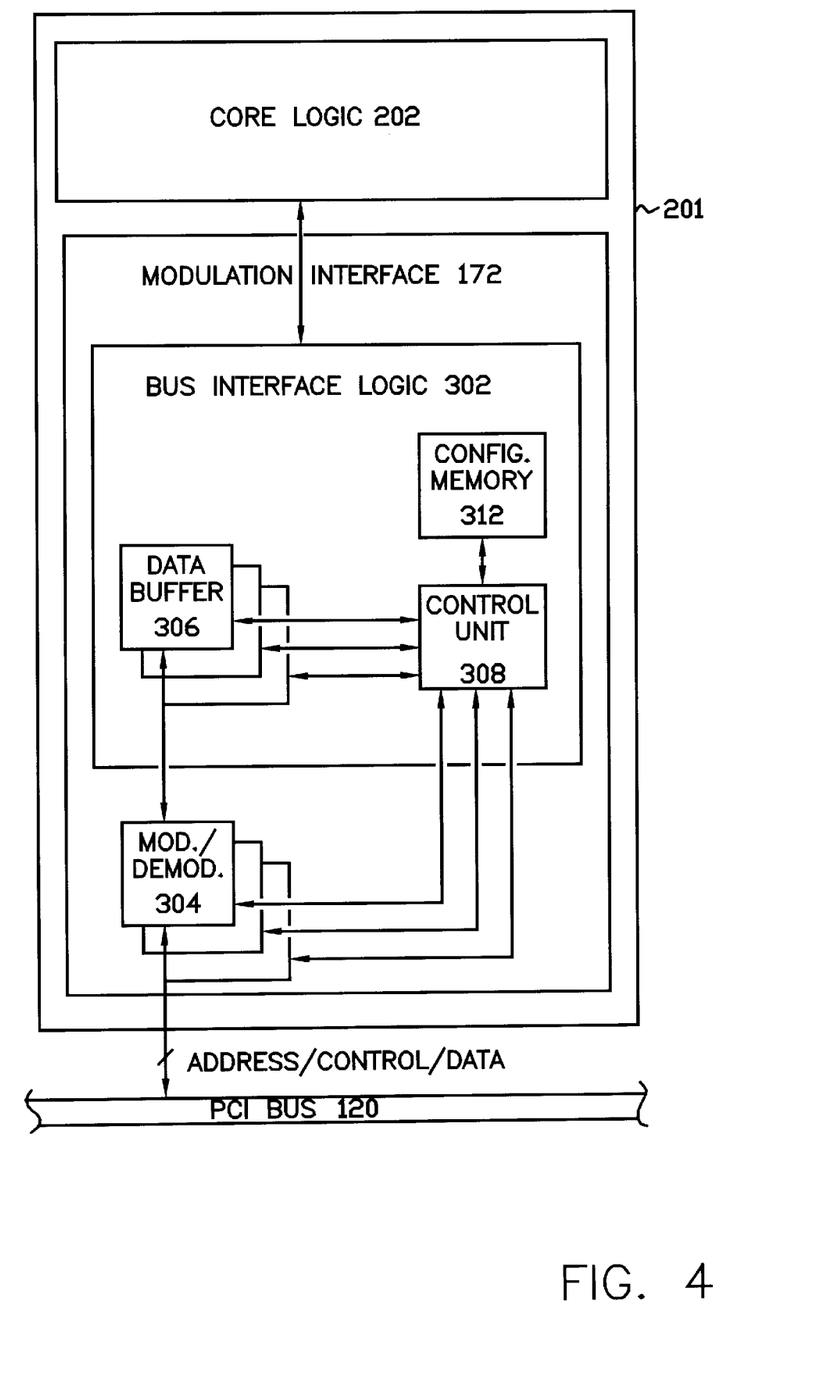
FIG. 4 is a block diagram of a typical component of the computer system of FIG. 1 including an embodiment of the modulation interface, wherein the component may be memory controller logic of a chip set logic, a video/graphics card, a sound card, a hard disk drive, a network interface controller, or a CD-ROM drive.

FIG. 4 is a block diagram of a typical component 201 of the computer system 100 of FIG. 1 including an embodiment of the modulation interface 172. The component 201 is illustrative of, for example, the memory controller logic 107 of the chip set logic 106, the video/graphics card 126, the sound card 128, the hard disk drive 122, the network interface controller 124, or the CD-ROM drive 132. Core logic 202 of component 201 implements the core functionality of a particular component. The modulation interface 172 is coupled between the core logic 202 and the signal lines of the PCI bus 120. The modulation interface 172 is configured to interface signals between the core logic 202 and the PCI bus 120. The modulation interface 172 includes a bus interface logic 302 and one or more combined modulators/demodulators (i.e., modems) 304. The bus interface logic 302 is coupled between the core logic 202 and the one or more modems 304. The bus interface logic 302 handles the exchange of data between the component 201 and other components coupled to the PCI bus 120 according to an established bus protocol. The bus interface logic 302 includes one or more data buffers 306, and a control unit 308 coupled to the one or more data buffers 306 and to the one or more modems 304. Each data buffer 306 corresponds to a given modem 304. The one or more data buffers 306 include a number of storage elements and provide temporary data storage. The data stored in each data buffer 306 is either received from the core logic 202 to be transferred to another device via the address/data lines of the PCI bus 120, or was received from the address/data lines of the PCI bus 120. Data received from the address/data lines of the PCI bus 120 may be transferred to the core logic 202. The bus interface logic 302 also includes a configuration memory 312 coupled to the control unit 308. The configuration memory 312 includes several storage elements used to store a list of the PCI bus 120 communication channels other devices coupled to the PCI bus 120 are configured to use.

It is noted that computer system 100 may include other components having a modulation interface 172 for transferring data via binary data signals or data-modulated carrier signals. Examples of such components include modem cards, telephony cards, other storage devices such as DVD (digital video disk) drives, and other multimedia devices. The CPU 102 may also include a modulation interface 172.

The one or more modems 304 are coupled between the bus interface logic 302 and the multiplexed address/data lines and the control lines of the PCI bus 120. In a transmit mode, a modem 304 receives binary data signals from the corresponding data buffer 306. In response to one or more control signals from the control unit 308, the modem 304 may drive the binary data signals upon the address/data or control lines of the PCI bus 120. Alternatively, the modem 304 modulates a sinusoidal a.c. carrier waveform according to the binary data signals. Prior to modulation, the carrier signal has a non-zero "center" frequency. Modulation of the carrier signal produces a data-modulated carrier signal. The modem 304 drives the data-modulated carrier signal upon the address/data or control lines of the PCI bus 120.

In a receive mode, the modem 304 receives signals from the address/data and control lines of PCI bus 120. In response to one or more control signals from the control unit 308, the modem 304 may transfer binary data signals present upon the PCI bus 120 to the corresponding data buffer 306. Alternatively, the modem 304 demodulates a data-modulated carrier signal present upon a selected one or several address/data or control lines of the PCI bus 120 in order to extract binary data signals, and transfers the binary data signals to the corresponding data buffer 306.

The data-modulated carrier signals are created by modulating a sinusoidal a.c. carrier waveform in amplitude, frequency, or phase according to a modulation technique. It is noted that analog signals produced by a device coupled to PCI bus 120 may be transmitted in analog form via a channel of the PCI bus 120 provided a receiving modulation interface 172 includes an analog-to-digital converter. Well known analog signal modulation techniques include amplitude modulation, frequency modulation, and phase modulation. Corresponding digital signal modulation techniques are amplitude-shift keying (ASK), frequency-shift keying (FSK), and phase-shift keying (PSK), respectively. Other common digital signal modulation techniques include quadrature amplitude modulation (QAM) and quaternary phase shift keying (QPSK). Embodiments employing any of these modulation techniques are contemplated.

For simplicity, each modem 304 of a modulation interface 172 may be configured to transfer data using a preselected communication channel of PCI bus 120. Accordingly, each modem 304 using channels 2 through n may be assigned carrier signals having different center frequencies. Master and target devices must include modulation interfaces 172 having at least one communication channel in common in order to communicate with one another.

When two or more master devices include a modulation interface 172 configured to operate using the same communication channels, control of the communication channels of PCI bus 120 must be arbitrated. In this case, the bus arbiter 134 includes logic to arbitrate control of the individual communication channels of PCI bus 120 among the master devices. In the PCI bus architecture, each master device is coupled to the bus arbiter 134 by dedicated bus request 'REQ#' and bus grant 'GNT#' signal lines. When a master device desires use of a given carrier modulation communication channel, the master device may assert the 'REQ#' signal by driving the 'REQ#' signal line with a data-modulated carrier signal having a center frequency assigned to the desired communication channel. Upon receiving the asserted 'REQ#' signal, the bus arbiter 134 indicates access to the desired communication channel by asserting the 'GNT#' signal by driving the 'GNT#' signal line with a data-modulated carrier signal having a center frequency assigned to the desired communication channel.

The configuration memory 312 of the modulation interface 172 is preferably programmed at system initialization (i.e., "boot") time to include the list of the PCI bus 120 communication channels other devices coupled to the PCI bus 120 are configured to use. Inclusion of the configuration memory 312 within the modulation interface 172 allows a master device coupled to the PCI bus 120 to exchange data with a target device coupled to the PCI bus 120 by selecting a channel from the list of channels the target device is configured to use. Each modulation interface 172 preferably uses "Plug and Play" information received from the computer operating system to generate and maintain the list. More information about the "Plug and Play" standard may be obtained from the Plug and Play BIOS Specification Version 1.0a and the Plug and Play ISA Specification Version 1.0A. It is noted that a master device and a target device may communicate using any of the communication channels their modulation interfaces 172 have in common. If a first selected communication channel is in use (i.e., the 'GNT#' signal is not asserted by the bus arbiter 134 within a preset time interval following assertion of the 'REQ#' signal), the master device may select an alternate communication channel from the list of channels the target device is configured to use. This procedure may be repeated until an available communication channel is selected.

An exemplary communication accommodated by the computer system 100 of FIG. 1 is next described. Consider a read transaction carried out to transfer data from the modulated-signal-compatible CD-ROM drive 132 to the modulated-signal-compatible video/graphics card 126 over communication channel 2 of the PCI bus 120. The CD-ROM drive 132 first requests and is granted control of communication channel 2 of the PCI bus 120 using data-modulated carrier signals as described above. During the address phase of the read transaction, the modulation interface 172 of the video/graphics card 126 drives data-modulated carrier signals upon the address/data lines of the PCI bus 120 conveying an address assigned to the CD-ROM drive 132. The modulation interface 172 of the video/graphics card 126 also drives data-modulated carrier signals upon the control lines of the PCI bus 120 to identify the request as a read request. The modulation interface 172 of the CD-ROM drive 132 receives the data-modulated carrier signals and demodulates the data-modulated carrier signals to extract the binary information. The core logic of the CD-ROM drive 132 responds by retrieving the requested data corresponding to the address transmitted by the video/graphics card 126. During the data phase of the read transaction, the modulation interface 172 of the CD-ROM drive 132 drives data-modulated carrier signals upon the address/data lines of the PCI bus 120 conveying the requested data. The modulation interface 172 of the CD-ROM drive 132 also drives data-modulated carrier signals upon the control lines of the PCI bus 120 to convey the availability of the data. The modulation interface 172 of the video/graphics card 126 receives the data-modulated carrier signals and demodulates the data-modulated carrier signals to extract the binary information. The data conveyed using the data-modulated carrier signal may then be used by the core logic of the video/graphics card 126.

In an alternate embodiment of the computer system 100, data may be exchanged via data-modulated carrier signals conveyed between two components coupled to PCI bus 120 using only a subset of the plurality of signal lines of PCI bus 120. In a third embodiment of the computer system 100, data may be exchanged via a data-modulated carrier signal conveyed upon only a single signal line of the plurality of signal lines of PCI bus 120.

It is noted that a first pair of devices coupled to PCI bus 120 may exchange data using channel 1 (i.e., binary data signals), and a second pair of devices coupled to PCI bus 120 may exchange data simultaneously using channel 2 (i.e., a data-modulated carrier signal). Alternatively, a single master device may simultaneously communicate with two devices via different channels of the PCI bus 120.

Conclusion

Therefore, the present invention comprises a novel computer system architecture which includes devices capable of exchanging data using either binary data signals or a.c. signals created using carrier waveform modulation. The computer system includes a common bus having a signal bandwidth divided up into two or more separate communication channels. A first channel has a signal bandwidth extending from 0 Hz to an upper frequency limit $f_{H1}$, and is reserved for binary data signals. The signals associated with two or more data transfers occurring within different communication channels at the same time are superimposed upon one another on the signal lines of the common bus. The signals do not interfere with one another, however, thus allowing simultaneous communication between devices via different communication channels. The ability to transfer data using conventional data signals allows compatibility with existing devices. The present invention allows the full signal bandwidth of a common bus to be utilized, providing improved efficiency for data transfers via the common bus and increased computer system performance.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer system comprising:

a CPU;

a main memory coupled to the CPU which stores data accessible by the CPU;

a chip set logic coupled to the CPU and to the main memory;

an expansion bus coupled to the chip set logic and adapted for transferring data, wherein the expansion bus comprises a plurality of signal lines; and a plurality of peripheral devices coupled to the expansion bus and configured to transfer data via the expansion bus, wherein each of the plurality of peripheral devices is configured to accommodate data transfers via binary data signals conveyed upon the plurality of signal lines of the expansion bus, and wherein at least a first of the plurality of peripheral devices is configured to generate a data-modulated carrier signal to effectuate a transfer of data to a second of the plurality of peripheral devices, wherein the data-modulated carrier signal is formed by modulating an a.c. carrier waveform in response to binary data, and wherein the data-modulated carrier signal is conveyed simultaneously with at least one of the binary data signals upon at least one of the plurality of signal lines of the expansion bus.

2. The computer system of claim 1, wherein the expansion bus has a signal bandwidth, and wherein the signal bandwidth is partitioned to form a plurality of communication channels, and wherein each communication channel occupies a portion of the signal bandwidth of the expansion bus.

3. The computer system of claim 2, wherein a first communication channel of the plurality of communication channels of the expansion bus extends from 0 Hz to an upper frequency limit, and wherein the first communication channel is used for transferring data via binary data signals.

4. The computer system of claim 3, wherein each of the plurality of communication channels with the exception of the first communication channel is used for transferring data via data-modulated carrier signals.

5. The computer system of claim 4, wherein the a.c. carrier waveform is sinusoidal, and wherein the data-modulated carrier signal is formed by modulating the amplitude, frequency, or phase of the sinusoidal a.c. carrier waveform in response to binary data.

6. The computer system of claim 1, wherein both the first and second peripheral devices include a modulation interface in order to communicate via the data-modulated carrier signal.

7. The computer system as recited in claim 1, wherein the data-modulated carrier signal is conveyed simultaneously with one of the binary data signals upon a single one of the plurality of signal lines of the expansion bus.

8. A computer system comprising:

a CPU;

a main memory coupled to the CPU which stores data accessible by the CPU;

a chip set logic coupled to the CPU and to the main memory;

an expansion bus coupled to the chip set logic and adapted for transferring data, wherein the expansion bus comprises a plurality of signal lines; and a plurality of peripheral devices coupled to the expansion bus and configured to accommodate data transfers via binary data signals conveyed upon the plurality of signal lines of the expansion bus, wherein each of a subset of the plurality of peripheral devices includes a modulation interface configured to drive a data-modulated carrier signal upon at least one of the signal lines of the expansion bus, and wherein the data-modulated carrier signal is formed by modulating an a.c. carrier waveform in response to binary data, and wherein the data-modulated carrier signal is conveyed simultaneously with at least one of the binary data signals.

9. The computer system of claim 8, wherein the expansion bus has a signal bandwidth, and wherein the signal bandwidth is partitioned to form a plurality of communication channels, and wherein each communication channel occupies a portion of the signal bandwidth of the expansion bus.

10. The computer system of claim 9, wherein a first communication channel of the plurality of communication channels of the expansion bus extends from 0 Hz to an upper frequency limit, and wherein the first communication channel is used for transferring data via binary data signals.

11. The computer system of claim 10, wherein each of the plurality of communication channels with the exception of the first communication channel is used for transferring data via data-modulated carrier signals.

12. The computer system of claim 11, further comprising a memory controller coupled to the main memory for controlling transfers to or from the main memory, wherein the memory controller includes a modulation interface configured to communicate with the plurality of peripheral devices via data-modulated carrier signals conveyed upon the expansion bus.

13. The computer system of claim 12, wherein the modulation interface comprised in the memory controller receives data-modulated carrier signals transferred on the expansion bus and operates to convert the received data-modulated carrier signals to binary data signals and to store the binary data signals in the main memory.

14. The computer system of claim 11, wherein each of the data-modulated carrier signals is formed by modulating the amplitude, frequency, or phase of a sinusoidal a.c. carrier waveform in response to binary data.

15. The computer system of claim 9, wherein each modulation interface of the subset of the plurality of peripheral devices includes a configuration memory for storing a list of communication channels other peripheral devices are configured to use.

16. The computer system of claim 8, wherein at least one of the plurality of peripheral devices comprises video logic for performing video operations.

17. The computer system of claim 8, wherein at least one of the plurality of peripheral devices comprises audio logic for performing audio operations.

18. The computer system of claim 8, wherein at least one of the plurality of peripheral devices comprises a CD-ROM drive device for storing data.

19. The computer system as recited in claim 8, wherein the data-modulated carrier signal is conveyed simultaneously with one of the binary data signals upon a single one of the plurality of signal lines of the expansion bus.

20. A method of transferring binary data from a master device to a target device, wherein the master device includes a modulation interface configured to transfer data via data-modulated carrier signals, and wherein the master and target devices are coupled to an expansion bus, and wherein the expansion bus comprises a plurality of signal lines and a signal bandwidth, and wherein the signal bandwidth is partitioned to form a plurality of communication channels, and wherein a first communication channel of the plurality of communication channels extends from 0 Hz to an upper frequency limit, the method comprising:

the master device selecting a communication channel;

the master device generating an output signal consisting of: (i) the binary data if the selected communication channel is the first communication channel, or (ii) a data-modulated carrier signal if the selected communication channel is not the first communication channel, wherein the data-modulated carrier signal is formed by modulating an a.c. carrier waveform in response to the binary data;

the master device driving the output signal upon one of the plurality of signal lines of the expansion bus;

the target device receiving the output signal; and the target device converting the output signal to the binary data.

21. The method as recited in claim 20, wherein the step of selecting a communication channel comprises selecting a communication channel from a list of communication channels the target device is configured to use, and wherein the list is maintained in a configuration memory of the modulation interface of the master device.

22. The method as recited in claim 20, wherein the data-modulated carrier signal is formed by modulating the amplitude, frequency, or phase of a sinusoidal a.c. carrier waveform in response to the binary data.

* * * * *